US008830945B2

(12) United States Patent
Lee et al.

(10) Patent No.: US 8,830,945 B2
(45) Date of Patent: *Sep. 9, 2014

(54) METHOD FOR PROCESSING CONTROL INFORMATION IN A WIRELESS MOBILE COMMUNICATION SYSTEM

(75) Inventors: Young-Dae Lee, Gyeonggi-Do (KR); Sung-Duck Chun, Gyeonggi-Do (KR); Myung-Cheul Jung, Seoul (KR); Sung-Jun Park, Gyeonggi-Do (KR); Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 660 days.

This patent is subject to a terminal disclaimer.

(21) Appl. No.: 12/092,055

(22) PCT Filed: Oct. 25, 2006

(86) PCT No.: PCT/KR2006/004370
§ 371 (c)(1),
(2), (4) Date: Apr. 29, 2008

(87) PCT Pub. No.: WO2007/052916
PCT Pub. Date: May 10, 2007

(65) Prior Publication Data
US 2008/0285668 A1   Nov. 20, 2008

Related U.S. Application Data

(60) Provisional application No. 60/732,080, filed on Oct. 31, 2005, provisional application No. 60/732,288, filed on Oct. 31, 2005.

(30) Foreign Application Priority Data

Oct. 31, 2005  (KR) .................. 10-2005-0103510
Jul. 5, 2006   (KR) .................. 10-2006-0063139

(51) Int. Cl.
*H04L 12/28*   (2006.01)
*H04W 48/12*   (2009.01)
*H04L 5/00*    (2006.01)

(52) U.S. Cl.
CPC ............ *H04L 5/0094* (2013.01); *H04W 48/12* (2013.01); *H04L 5/0053* (2013.01)
USPC ......... 370/330; 370/395.4; 370/468; 370/478

(58) Field of Classification Search
None
See application file for complete search history.

(56) References Cited

U.S. PATENT DOCUMENTS 5,404,355 A   4/1995   Raith
5,697,055 A   12/1997  Gilhousen et al.
(Continued)

FOREIGN PATENT DOCUMENTS

CN   1371576   9/2002
CN   1505912   6/2004
(Continued)

OTHER PUBLICATIONS

NTT DoCoMo, et al, "Multiplexing Method of Shared Control Channel in Uplink Single-Carrier FDMA Radio Access," TSG-RSN WG1#42bis, R1-051143, Oct. 10, 2005.

(Continued)

*Primary Examiner* — Christine Duong
(74) *Attorney, Agent, or Firm* — Lee, Hong, Degerman, Kang & Waimey (57) ABSTRACT

In a wireless mobile communications system, a method for processing control information allows the operations of a mobile terminal to be simplified and permits efficient use of resources for the mobile terminal. The network instructs in advance, the transmission of control information, such as system information and the like, via a single indicator channel. The mobile terminal receives this single indicator channel and uses the indicator information that was transmitted via the indicator channel in order to receive the control information.

8 Claims, 4 Drawing Sheets

(56) References Cited

U.S. PATENT DOCUMENTS

| | | |
|---|---|---|
| 6,359,867 B1 | 3/2002 | Ali-Vehmas |
| 6,532,225 B1 | 3/2003 | Chang et al. |
| 6,563,807 B1 | 5/2003 | Kim et al. |
| 6,628,946 B1* | 9/2003 | Wiberg et al. ............... 455/434 |
| 6,845,238 B1 | 1/2005 | Muller |
| 6,920,155 B2 | 7/2005 | Rao |
| 6,968,192 B2 | 11/2005 | Longoni |
| 7,123,910 B2 | 10/2006 | Lucidarme et al. |
| 7,430,420 B2 | 9/2008 | Derakhshan et al. |
| 7,471,948 B2 | 12/2008 | Farnsworth et al. |
| 7,535,846 B2 | 5/2009 | Kim et al. |
| 7,551,937 B2 | 6/2009 | Kim et al. |
| 7,809,373 B2 | 10/2010 | Park et al. |
| 7,983,676 B2 | 7/2011 | Ju et al. |
| 8,134,974 B2 | 3/2012 | Chun et al. |
| 8,406,767 B2 | 3/2013 | Chun et al. |
| 2001/0016496 A1 | 8/2001 | Lee |
| 2001/0026543 A1 | 10/2001 | Hwang et al. |
| 2001/0030956 A1 | 10/2001 | Chillariga et al. |
| 2001/0036113 A1 | 11/2001 | Jurgensen et al. |
| 2002/0045448 A1 | 4/2002 | Park et al. |
| 2002/0048266 A1 | 4/2002 | Choi et al. |
| 2002/0051431 A1 | 5/2002 | Choi et al. |
| 2002/0052206 A1 | 5/2002 | Longoni |
| 2002/0071480 A1 | 6/2002 | Marjelund et al. |
| 2002/0085516 A1 | 7/2002 | Bridgelall |
| 2002/0122393 A1 | 9/2002 | Caldwell et al. |
| 2002/0159412 A1 | 10/2002 | Odenwalder et al. |
| 2002/0181436 A1 | 12/2002 | Mueckenheim et al. |
| 2003/0002472 A1 | 1/2003 | Choi et al. |
| 2003/0026324 A1 | 2/2003 | Li et al. |
| 2003/0035440 A1 | 2/2003 | Casaccia et al. |
| 2003/0053344 A1* | 3/2003 | Herrmann ............... 365/200 |
| 2003/0054829 A1 | 3/2003 | Moisio |
| 2003/0076812 A1 | 4/2003 | Benedittis |
| 2003/0081586 A1 | 5/2003 | Malladi et al. |
| 2003/0095552 A1 | 5/2003 | Bernhard et al. |
| 2003/0131300 A1 | 7/2003 | Park et al. |
| 2003/0202489 A1 | 10/2003 | Lee |
| 2003/0207696 A1* | 11/2003 | Willenegger et al. ......... 455/522 |
| 2004/0009767 A1 | 1/2004 | Lee et al. |
| 2004/0022217 A1 | 2/2004 | Korpela et al. |
| 2004/0029532 A1 | 2/2004 | Schwarz et al. |
| 2004/0053614 A1 | 3/2004 | Il-Gyu et al. |
| 2004/0085926 A1 | 5/2004 | Hwang et al. |
| 2004/0103435 A1* | 5/2004 | Yi et al. ............... 725/81 |
| 2004/0114574 A1 | 6/2004 | Zeira et al. |
| 2004/0127244 A1 | 7/2004 | Matsumoto et al. |
| 2004/0152478 A1 | 8/2004 | Ruohonen et al. |
| 2004/0162072 A1 | 8/2004 | Sigle et al. |
| 2004/0171401 A1 | 9/2004 | Balachandran et al. |
| 2004/0185852 A1 | 9/2004 | Son et al. |
| 2005/0059437 A1 | 3/2005 | Son et al. |
| 2005/0094586 A1 | 5/2005 | Zhang et al. |
| 2005/0105488 A1 | 5/2005 | Raji et al. |
| 2005/0105505 A1 | 5/2005 | Fishler et al. |
| 2005/0107105 A1 | 5/2005 | Wakabayashi |
| 2005/0119004 A1 | 6/2005 | Gao et al. |
| 2005/0138528 A1 | 6/2005 | Ameigeiras et al. |
| 2005/0153700 A1* | 7/2005 | Farnsworth et al. ......... 455/446 |
| 2005/0159161 A1 | 7/2005 | Florkey et al. |
| 2005/0177623 A1 | 8/2005 | Roberts et al. |
| 2005/0181801 A1* | 8/2005 | Funnell ............... 455/452.2 |
| 2005/0197132 A1 | 9/2005 | Lee et al. |
| 2005/0227691 A1 | 10/2005 | Pecen et al. |
| 2005/0282547 A1 | 12/2005 | Kim et al. |
| 2006/0039327 A1 | 2/2006 | Samuel et al. |
| 2006/0056355 A1 | 3/2006 | Love et al. |
| 2007/0010268 A1* | 1/2007 | Kim et al. ............... 455/509 |
| 2007/0032255 A1 | 2/2007 | Koo |
| 2007/0049344 A1 | 3/2007 | Van Der Velde et al. |
| 2007/0117563 A1* | 5/2007 | Terry et al. ............... 455/434 |
| 2007/0133458 A1 | 6/2007 | Chandra et al. |
| 2007/0147315 A1 | 6/2007 | Khoury et al. |
| 2007/0155388 A1 | 7/2007 | Petrovic et al. |
| 2008/0062905 A1* | 3/2008 | Goldberg et al. ............. 370/312 |
| 2008/0123585 A1 | 5/2008 | Granzow et al. |
| 2008/0254800 A1 | 10/2008 | Chun et al. |
| 2008/0268852 A1 | 10/2008 | Petrovic et al. |
| 2009/0207810 A1 | 8/2009 | Petrovic et al. |

FOREIGN PATENT DOCUMENTS

| | | |
|---|---|---|
| CN | 1567769 A | 1/2005 |
| EP | 0939569 | 9/1999 |
| EP | 1220490 | 7/2002 |
| EP | 1326460 | 7/2003 |
| EP | 1505782 | 2/2005 |
| EP | 1519519 | 3/2005 |
| EP | 1553798 | 7/2005 |
| EP | 1565026 | 8/2005 |
| GB | 2332340 | 6/1999 |
| JP | 09-186704 | 7/1997 |
| JP | 10-136426 | 5/1998 |
| JP | 11-146462 | 5/1999 |
| JP | 11-196477 | 7/1999 |
| JP | 11-341541 | 12/1999 |
| JP | 2000-069531 | 3/2000 |
| JP | 2001-078246 | 3/2001 |
| JP | 2001-313968 | 11/2001 |
| JP | 2003-500950 | 1/2003 |
| JP | 2003-087842 | 3/2003 |
| JP | 2003-111148 | 4/2003 |
| JP | 2003102055 | 4/2003 |
| JP | 2003-152600 | 5/2003 |
| JP | 2003523687 | 8/2003 |
| JP | 2003324761 | 11/2003 |
| JP | 2004-135287 | 4/2004 |
| JP | 2004-208177 | 7/2004 |
| JP | 2004-221760 | 8/2004 |
| JP | 2004-289234 | 10/2004 |
| JP | 2005-509313 | 4/2005 |
| JP | 2005-124215 | 5/2005 |
| JP | 2005513907 | 5/2005 |
| JP | 2005-525065 | 8/2005 |
| JP | 2005-237031 | 9/2005 |
| JP | 2005-260337 | 9/2005 |
| JP | 2005-277570 | 10/2005 |
| JP | 2006-507753 | 3/2006 |
| JP | 2007-502557 | 2/2007 |
| KR | 10-2003-0007481 | 1/2003 |
| KR | 10-2003-0056143 | 7/2003 |
| KR | 1020030080946 | 10/2003 |
| KR | 1020040025491 | 3/2004 |
| KR | 1020040040723 | 5/2004 |
| KR | 10-2005-0032285 | 4/2005 |
| KR | 1020050032949 | 4/2005 |
| KR | 10-2005-0032285 | 7/2005 |
| KR | 10-2005-0078635 | 8/2005 |
| KR | 10-2005-0084908 | 8/2005 |
| KR | 1020050078636 | 8/2005 |
| KR | 10-0688303 | 3/2007 |
| RU | 2145774 | 2/2000 |
| RU | 2149518 | 5/2000 |
| RU | 2216100 | 11/2003 |
| TW | I236241 | 7/2005 |
| WO | 00/72609 | 11/2000 |
| WO | 00/74420 | 12/2000 |
| WO | 01/05121 | 1/2001 |
| WO | 01/35586 | 5/2001 |
| WO | 02/09825 | 2/2002 |
| WO | 0241509 | 5/2002 |
| WO | 03/017544 | 2/2003 |
| WO | 03017544 | 2/2003 |
| WO | 03/088691 | 10/2003 |
| WO | 03/096149 | 11/2003 |
| WO | 03-096731 | 11/2003 |
| WO | 2003-103320 | 12/2003 |
| WO | 2004/016016 | 2/2004 |
| WO | 2004016007 | 2/2004 |
| WO | 20041017541 | 2/2004 |
| WO | 20041089013 | 10/2004 |
| WO | 2005/011134 | 2/2005 |
| WO | 2005/018255 | 2/2005 |

(56) References Cited

FOREIGN PATENT DOCUMENTS

| WO | 20051/060132 | 6/2005 |
|---|---|---|
| WO | 05/078966 | 8/2005 |
| WO | 2005/072073 | 8/2005 |
| WO | 2005/083912 | 9/2005 |
| WO | 2005/089002 | 9/2005 |

OTHER PUBLICATIONS

LG Electronics, "Functions of E-RRC and E-MAC," TSG-RAN Working Group 2 #48bis, R2-052768, Oct. 10, 2005.

Seizo Onoe, Jun Tajima, Takanori Utano and Narumi Umeda; "Control Channel Structure for TDMA Mobile Radio Systems;" NTT Radio Communication systems laboratories, p. 270-275; 1-2356, Take, Yokosuka, 239, Japan; 1990 IEEE.

Onoe, et al., "Control Channel Structure for TDMA Mobile Radio Systems," 40th IEEE Vehicular Technology Conference, May 6, 1990, pp. 270-275.

IEEE Standard, "Part 16: Air Interface for Fixed Broadband Wireless Access Systems," IEEE Std 802.16, Oct. 2004.

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", 3GPP TR 25.813 V7.0.0, Jun. 2006.

Nokia, "Intra-radio access mobility, Handover in LTE_ACTIVE", 3GPP TSG-RAN WG2#50, R2-060053, Jan. 2006.

Nokia et al., "Intra-LTE Handover operation", 3GPP TSG-RAN WG2 Meeting #53, R2-061135, May 2006.

Nokia et al., "E-UTRA Transport Channels", 3GPP TSG-RAN WG2 Meeting #48bis, R2-052438, Oct. 2005.

NTT DOCOMO, "Physical Channel Structures for Evolved UTRA", 3GPP TST-RAN WG1 Meeting #41, R1-050464, May 2005.

NTT DOCOMO et al, "Physical Channels and Multiplexing in Evolved UTRA Downlink", 3GPP TSG-RAN WG1 #42 on LTE, R1-050707, Aug. 2005.

NTT DoCoMo, Inc. et al., "System Information Structure in LTE", R2-062162, 3GPP TSG-RAN WG2 #54, Aug. 2006, XP002465834.

Nokia, "On the DL frequency resource block dimensioning", R1-051091, 3GPP TSG RAN WG1 Meeting #42bis, Oct. 2005, XP050100706.

LG Electronics, "Downlink Channels and Mapping for Evolved UTRA", R2-052393, TSG-RAN Working Group 2 #48bis, Oct. 2005, XP050129506.

Qualcomm Europe, "L2 Buffer Management at E-UTRAN Cell Change", R2-052475, 3GPP TSG-RAN WG2 meeting #48bis, Oct. 2005, Xp-002670656.

NEC et al., "EUTRAN handover procedure for LTE_ACTIVE", R3-051106, Joint RAN2-RAN3 #48bis LTE, Oct. 2005, XP-050158616.

Draft Amendment to IEEE Standard for Local and metropolitan area networks, "Part 16: Air Interface for Fixed and Mobile Broadband Wireless Access Systems; Amendment for Physical and Medium Access Control Layers for Combined Fixed and Mobile Operation in Licensed Bands", IEEE P802.16e/D12, Oct. 2005, XP-002670655.

United States Patent and Trademark Office Application U.S. Appl. No. 13/487,081, Notice of Allowance dated Jan. 4, 2013, 11 pages.

Japan Patent Office Application U.S. Appl. No. 2012-179500, Office Action dated Nov. 26, 2013, 4 pages.

United States Patent and Trademark Office Application U.S. Appl. No. 12/092,060, Office Action dated Dec. 4, 2013, 10 pages.

Samsung, "Downlink Signaling requirement for MBMS," 3GPP TSG-RAN WG2 meeting #30, R2-021670, Jun. 2002, 3 pages.

InterDigital Communication, "Intra-Lte Handover—Context Transfer and Data forwarding," 3GPP TSG RAN3 #52, R3-060751, May 2006, 11 pages.

European Patent Office Application Serial No. 13002307.0, Search Report dated Aug. 14, 2013, 7 pages.

Intellectual Property Office of India Application Serial No. 1326/KOLNP/2008, Office Action dated Jul. 30, 2013, 1 page.

Intellectual Property Office of India Application Serial No. 1373/KOLNP/2008, Office Action dated Jul. 22, 2013, 2 pages.

The State Intellectual Property Office of the People's Republic of China Application Serial No. 200680040353.8, Office Action dated Jan. 5, 2013, 6 pages.

InterDigital Communication, "Intra-LTE Handover—Context Transfer and Data forwarding," R3-060751, 3GPP TSG RAN3 #52, May 2006, XP50159655, 11 pages.

Siemens, "SDU Forwarding During Intra-LTE Hand-Over," R3-060775, 3GPP TSG RAN WG3 Meeting #52, Apr. 2006, XP50159678, 3 pages.

European Patent Office Application Serial No. 06812263.9, Office Action dated Feb. 26, 2013, 8 pages.

European Patent Office Application Serial No. 06812212.6, Search Report dated Aug. 20, 2013, 5 pages.

3rd Generation Partnership Project (3GPP), "Technical Specification Group Radio Access Network; Radio Resource Control (Rrc); Protocol Specification (Release 6)," 3GPP TS 25.331 V6.7.0, Sep. 2005, 1167 pages.

United States Patent and Trademark Office U.S. Appl. No. 12/092,060, Final Office Action dated Mar. 24, 2014, 10 pages.

* cited by examiner

METHOD FOR PROCESSING CONTROL INFORMATION IN A WIRELESS MOBILE COMMUNICATION SYSTEM

CROSS-REFERENCE TO RELATED APPLICATIONS

This application is the National Stage filing under 35 U.S.C. 371 of International Application No. PCT/KR2006/004370 filed on Oct. 25, 2006, which claims the benefit of earlier filing date and right of priority to Korean Patent Application No. 10-2005-0103510 filed on Oct. 31, 2005 and Korean Patent Application No. 10-2006-0063139 filed on Jul. 5, 2006, and also claims the benefit of U.S. Provisional Application No. 60/732,080 filed on Oct. 31, 2005 and U.S. Provisional Application No. 60/732,288 filed on Oct. 31, 2005.

TECHNICAL FIELD

The present invention relates to wireless (radio) mobile communication systems, and in particular, relates to a method for processing control information allows the operations of a mobile terminal to be simplified and permits efficient use of resources for the mobile terminal.

BACKGROUND ART

To support broadband wireless (e.g., WiMAX) access, there are different types of broadband wireless air interfaces, such as cellular 3G technologies (e.g., UMTS, WCDMA, etc.), and multi-carrier based multiple access techniques (e.g., OFDMA, OFDM-TDMA, OFDM-CDMA, etc.). Frequency division multiplexing involves sub-channelization, of which at least four types (OFDM, Flash OFDM, sOFDMA and OFDMA) exist.

Orthogonal Frequency Division Multiplexing (OFDM) involves the splitting of a radio signal into multiple smaller sub-signals that are then transmitted simultaneously at different frequencies to a receiver. OFDM refers to a form of multi-carrier transmission where all the sub-carriers are orthogonal to each other. Certain IEEE standards and 3GPP standards are related to various aspects of OFDM.

Figure 1:
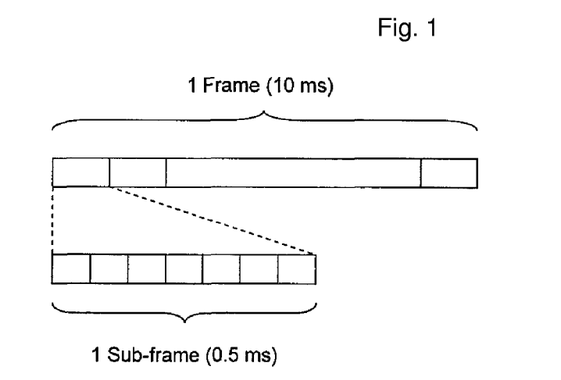
FIG. 1 shows an exemplary structure of one frame used in OFDM.
Figure 2:
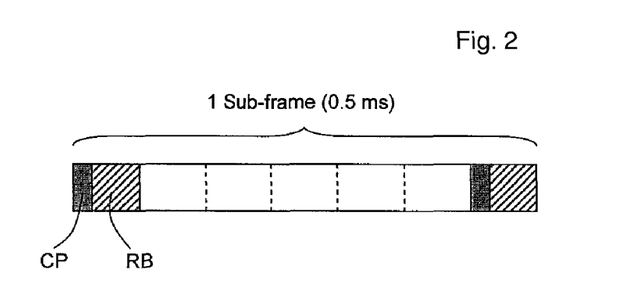
FIG. 2 shows an exemplary structure of one sub-frame within the frame of FIG. 1.

FIGS. 1 and 2 show a typical frame that is used in OFDM. One frame has a time duration of 10 ms (milliseconds) and consists of 20 sub-frames, each having a time duration of 0.5 ms. Each sub-frame may consist of a resource block (RB) that contains data or information, and a cyclic prefix (CP) that is a guard interval needed for conventional OFDM modulation (but not needed for OFDM with pulse shaping, i.e., OFDM/OQAM). The sub-frame duration corresponds to the minimum downlink TTI (Transmission Time Interval).

Figure 3:
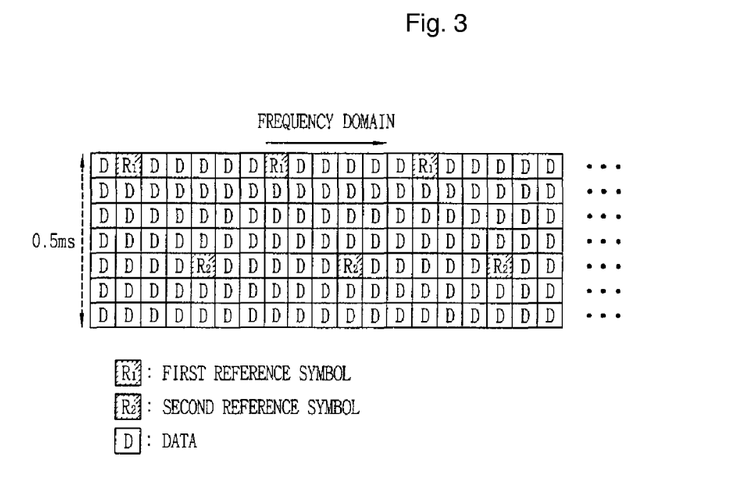
FIG. 3 shows an example of how data and reference symbols for OFDM may be expressed in the frequency domain and the time domain.

FIG. 3 shows a basic downlink reference-signal structure consisting of known reference symbols. Namely, a mapping of physical channel symbols in frequency domain is shown. In other words, channel-coded, interleaved, and data-modulated information (i.e., Layer 3 information) is mapped onto OFDM time/frequency symbols. The OFDM symbols can be organized into a number (M) of consecutive sub-carriers for a number (N) of consecutive OFDM symbols.

Here, it is assumed that 7 OFDM symbols exist per sub-frame (when the CP length is short). In case of a long CP or a different frame structure, this basic downlink reference-signal structure would be slightly different.

Reference symbols (i.e., first reference symbols) are located in the first OFDM symbol of every sub-frame assigned for downlink transmission. This is valid for both FDD and TDD, as well as for both long and short CP. Additional reference symbols (i.e., second reference symbols) are located in the third last OFDM symbol of every sub-frame assigned for downlink transmission. This is the baseline for both FDD and TDD, as well as for both long and short CP. However, for FDD, an evaluation of whether the second reference symbols are need should be made.

Figure 4:
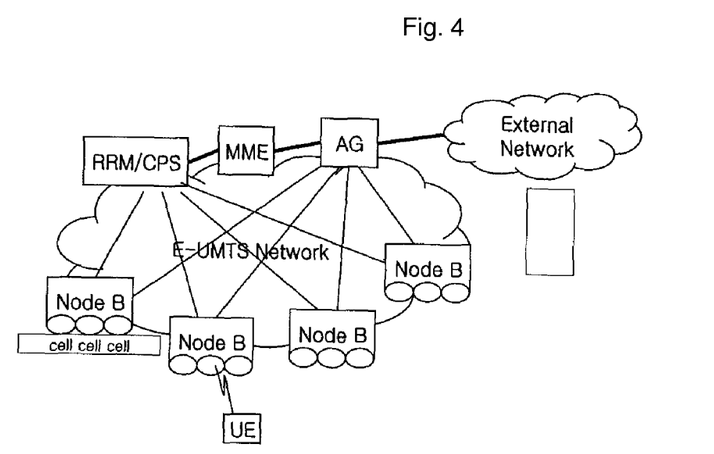
FIG. 4 shows an overview of a E-UMTS network architecture.

FIG. 4 shows an exemplary structure of an Evolved Universal Mobile Telecommunications System (E-UMTS). The E-UMTS system is a system that has evolved from the UMTS system, and its standardization work is currently being performed by the 3GPP standards organization.

The E-UMTS network generally comprises at least one mobile terminal (i.e., user equipment: UE), base stations (i.e., Node Bs), a control plane server (CPS) that performs radio (wireless) control functions, a radio resource management (RRM) entity that performs radio resource management functions, a mobility management entity (MME) that performs mobility management functions for a mobile terminal, and an access gateway (AG) that is located at an end of the E-UMTS network and connects with one or more external networks. Here, it can be understood that the particular names of the various network entities are not limited to those mentioned above.

The various layers of the radio interface protocol between the mobile terminal and the network may be divided into L1 (Layer 1), L2 (Layer 2), and L3 (Layer 3) based upon the lower three layers of the Open System Interconnection (OSI) standard model that is known the field of communication systems. Among these layers, a physical layer that is part of Layer 1 provides an information transfer service using a physical channel, while a Radio Resource Control (RRC) layer located in Layer 3 performs the function of controlling radio resources between the mobile terminal and the network. To do so, the RRC layer exchanges RRC messages between the mobile terminal and the network. The functions of the RRC layer may be distributed among and performed within the Node B, the CPS/RRM and/or the MME.

Figure 5:
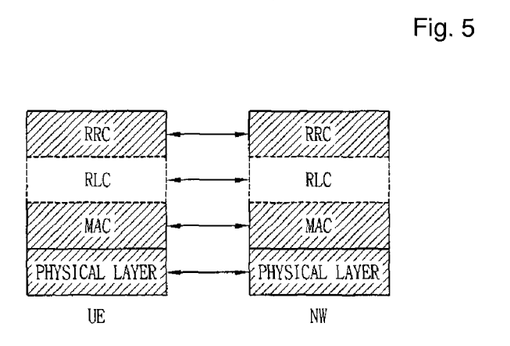
FIGS. 5 and 6 show an exemplary structure (architecture) of a radio interface protocol between a mobile terminal and a UTRAN according to the 3GPP radio access network standard.
Figure 6:
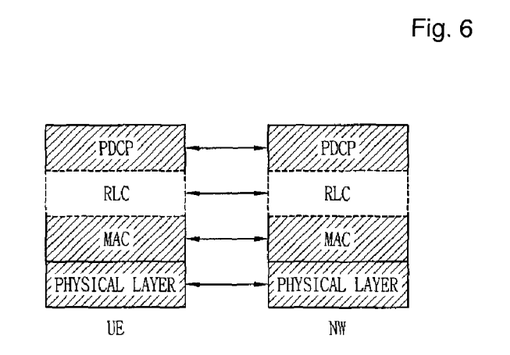

FIGS. 5 and 6 show an exemplary architecture of the radio interface protocol between the mobile terminal and the UTRAN (UMTS Terrestrial Radio Access Network). The radio interface protocol of FIGS. 5 and 6 is horizontally comprised of a physical layer, a data link layer, and a network layer, and vertically comprised of a user plane for transmitting user data and a control plane for transferring control signaling. The radio interface protocol layer of FIGS. 5 and 6 may be divided into L1 (Layer 1), L2 (Layer 2), and L3 (Layer 3) based upon the lower three layers of the Open System Interconnection (OSI) standards model that is known the field of communication systems.

Particular layers of the radio protocol control plane of FIG. 5 and of the radio protocol user plane of FIG. 6 will be described below. The physical layer (i.e., Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The MAC layer of Layer 2 provides services to a radio link control (RLC) layer (which is a higher layer) via a logical channel. The RLC layer of Layer 2 supports the transmission of data with reliability. It should be noted that the RLC layer in FIGS. 5 and 6 is depicted in dotted lines, because if the RLC functions are implemented in and performed by the MAC layer, the RLC layer itself may not need to exist. The PDCP layer of Layer 2 performs a header compression function that reduces unnecessary control information such that data being transmitted by employing Internet protocol (IP) packets, such as IPv4 or IPv6, can be efficiently sent over a radio (wireless) interface that has a relatively small bandwidth.

The radio resource control (RRC) layer located at the lowermost portion of Layer 3 is only defined in the control plane, and handles the control of logical channels, transport channels, and physical channels with respect to the configuration, reconfiguration and release of radio bearers (RB). Here, the RB refers to a service that is provided by Layer 2 for data transfer between the mobile terminal and the UTRAN.

As for channels used in downlink transmission for transmitting data from the network to the mobile terminal, there is a broadcast channel (BCH) used for transmitting system information, and a shared channel (SCH) used for transmitting user traffic or control messages. As for channels used in uplink transmission for transmitting data from the mobile terminal to the network, there is a random access channel (RACH) used for transmitting an initial control message, and a shared channel (SCH) used for transmitting user traffic or control messages.

DISCLOSURE OF INVENTION

Technical Problem

Before sending data to a particular mobile terminal, an indicator (which informs in advance that a notification message for a multicast and broadcast service will be transmitted) is transmitted through a separate (distinct) channel. In addition to this channel, the mobile terminal must also receive other channels, such as a broadcast channel used to periodically transmit system information. As there are a large total number of channels that a mobile terminal should receive due to transmissions through separate (distinct) channels according to each type of purpose, problems related to more complicated mobile terminal operations and a waste of mobile terminal resources occur.

Technical Solution

The present invention has been developed in order to solve the above described problems of the related art. As a result, the present invention provides a method for processing control information such that the operations of a mobile terminal can be simplified and permits efficient use of resources for the mobile terminal.

MODE FOR THE INVENTION

One aspect of the present invention is the recognition by the present inventors regarding the problems and drawbacks of the related art described above and explained in more detail hereafter. Based upon such recognition, the features of the present invention have been developed.

In the related art, it can be said that the system information is always fixed or non-flexible. Such fixed format allows a mobile terminal to easily detect and properly read the system information transmitted from the network.

In contrast, the features of the present invention allow at least some portions of the system information to be dynamically (or flexibly) changed. Appropriate indicators are included such that a mobile terminal can properly detect and read the dynamic (flexible) system information. As a result, additional system information may be added as desired in order to support technical evolution and advancements, which thus allows for future enhancements or continued expansion of currently used system information.

It should be noted that the features of the present invention are related to issues regarding the long-term evolution (LTE) of the 3GPP standard. As such, the 3GPP TS 25.813 (LTE TR) and its related sections or portions thereof, as well as various developing enhancements thereof pertain to the present invention. Such enhancements and evolution have resulted in the use of a particular prefix (the letter E) when labeling various network entities (e.g., eNode B), protocol layers, channels, and the like. However, it can be clearly understood that such labeling and other terminology are merely exemplary and thus may be altered (or later clarified) as a result of ongoing or future discussions.

Figure 7:
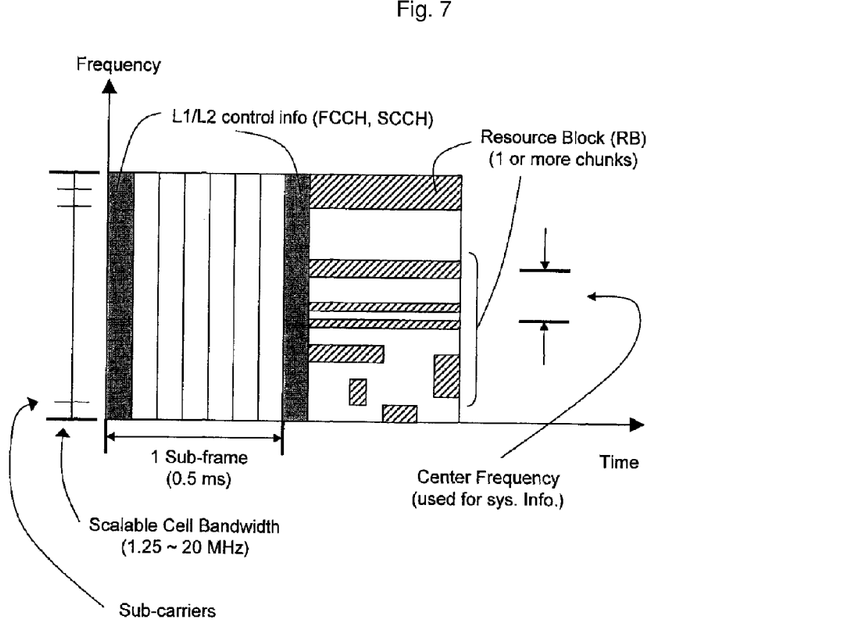
FIG. 7 is a diagram to explain the features of the present invention by showing where the control information and resource blocks may be located within each sub-frame with respect to frequency and time.

FIG. 7 is a diagram to explain the features of the present invention by showing where the control information and resource blocks may be located within each sub-frame with respect to frequency and time.

The structure (format) of a sub-frame in relation to the frequency domain and the time domain can be understood from FIG. 7. Namely, a single sub-frame has a time duration of 0.5 ms with 7 OFDM symbols (portions) therein.

In the first portion of the sub-frame, control information (i.e., L1/L2 control information, FCCH, SCCH, etc.) is included, while resource blocks (RBs) that may be in the form of one or more chunks may be located in the remaining portion of the subframe. Here, a resource block may occupy the entire time duration of the sub-frame (excluding the time duration for the control information) or some partial time duration thereof. Also, each resource block (RB) may use a particular frequency range (i.e., a particular number of sub-carriers).

The frequency axis can be referred to as a scalable cell bandwidth, which typically has a frequency range of 1.25-20

MHz. A plurality of sub-carriers exists in the scalable cell bandwidth. Of this frequency range, a so-called center frequency (of approximately 10 MHz) is mainly used in transmitting system information.

In the related art, such system information is considered to be fixed. Although this allows the terminal to easily read the system information, addition of new system information is not possible. In contrast, the present invention allows for at least part of the system information to be flexible (or dynamic).

To do so, the present invention divides (or separates or distinguishes) the system information into primary system information (e.g., Master Information Block: MIB) and non-primary (or secondary) system information (e.g., System Information Block: SIB).

The MIB is transmitted in a static manner (e.g., via a BCH for fixed manner transmission), while the SIB is transmitted in a dynamic manner (e.g., via a downlink SCH for dynamic manner transmission). Here, transmission in a dynamic manner means that different frequency ranges and time durations can be used.

For each frame, the MIB contains information about where each SIB is located. Namely, the particular frequency range (i.e., sub-carriers) and particular time duration (i.e., symbols) for each SIB is specified to allow the terminal (UE) to properly read the appropriate SIBs. For example, the MIB may indicate that a particular UE (e.g., UE #11) should read a particular resource block (e.g., RB #3). Here, the RB #3 can also be expressed as the information located at certain sub-carriers and certain symbols (e.g., at sub-carriers #13~60 and symbols #3~5).

In a similar manner, for each sub-frame within one frame, the control information (located in the first portion) contains information about where each resource block (RB) is located. Namely, the frequency range and particular time duration for each RB is specified to allow the terminal (UE) to properly read the appropriate RBs.

The above concepts generally depicted in FIG. 7 will be explained in more detail in the following description with reference to FIGS. 8 through 11.

Figure 8:
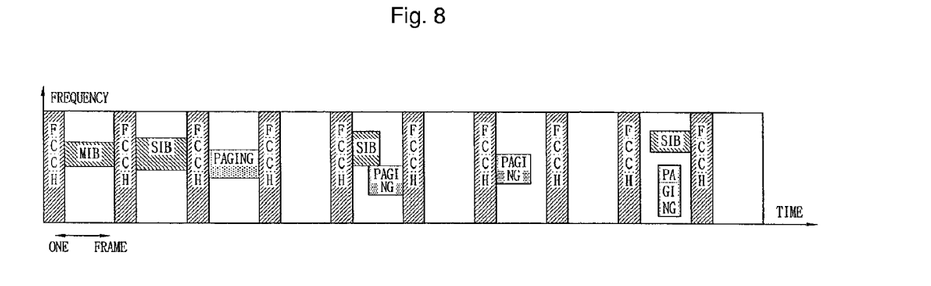
FIG. 8 is a diagram used to explain a control information transmission and reception method according to an exemplary embodiment of the present invention.

FIG. 8 is a diagram used to explain a control information transmission and reception method according to an exemplary embodiment of the present invention. The network transmits a frame control channel (FCCH) at every particular period (i.e., a first period). Hereafter, the particular period is referred to as a frame.

It should be noted that the FCCH may also be described in different terms. Namely, the control information transmitted by the network may be called L1/L2 control information, FCCH, SCCH, or the like. Hereafter, such control information will mostly be referred to as FCCH, merely for the sake of explanation (although control information and SCCH are also described).

As shown in FIG. 8, a MIB (Master Information Block) is repetitively transmitted at every second period, which is different that the above-mentioned first period. The MIB includes scheduling information for a SIB (System Information Block) that transmits system information and other resource blocks (RBs) for each type of control information. Namely, the MIB provides scheduling information related to which frequency and what time is used to transmit each type of control information, such as multiple SIBs, and the like. The second period may set to be greater than the first period. The MIB may be transmitted in the first frame of the period in which the MIB is to be transmitted.

Here, the FCCH that is transmitted in each frame can inform about whether the data transmitted in the corresponding time duration (frame) is a common control message, a control message dedicated for a particular mobile terminal, common data, or data dedicated for a particular mobile terminal. Also, the FCCH informs about which frequency and what time within the frame that a control message or data of the control information is transmitted.

The mobile terminal periodically receives the FCCH at every first period. If the FCCH of a particular frame indicates the transmission of a MIB, the mobile terminal receives the MIB at the corresponding frequency and time in accordance with the scheduling information included in the indicator information transmitted through the FCCH. By referring to the MIB, the mobile terminal can obtain scheduling information for particular messages, particular indicator messages, and the like. Through such scheduling information, the mobile terminal can determine which frequency and what time was used to transmit a particular SIB or the like. According to such scheduling information, the mobile terminal can receive a message with respect to the SIB, and the subscribed service that is should receive.

The MIB may include either a mobile terminal identifier or a service identifier, or may include an indicator that indicates such an identifier.

Figure 9:
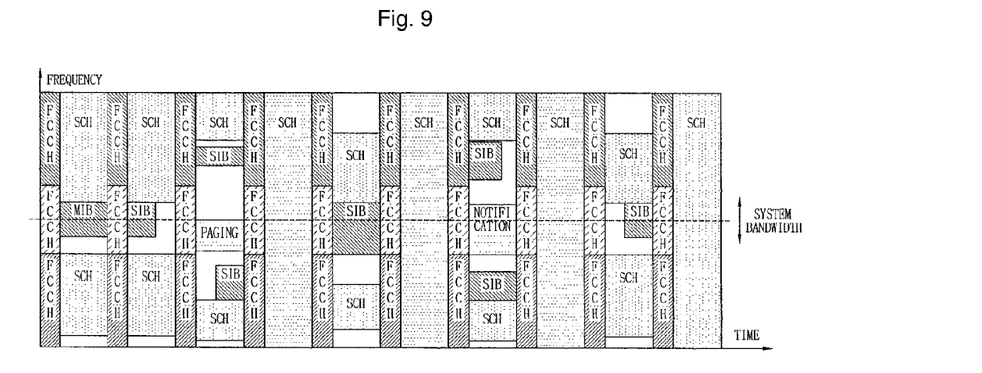
FIG. 9 is a diagram used to explain a control information transmission and reception method according to another exemplary embodiment of the present invention.

FIG. 9 is a diagram used to explain a control information transmission and reception method according to another exemplary embodiment of the present invention. A cell that supports broadband frequencies with a bandwidth of 10 or 20 MHz, can provide a system bandwidth of narrowband frequencies for a mobile terminal operating in narrowband frequencies such as 1.25 MHz, 2.5 MHz, or the like. In this case, as shown in FIG. 9, a central bandwidth of the broadband frequencies is typically used for the system bandwidth. Here, the MIB, the SIBs, and the like should all be transmitted in the system bandwidth. However, SIBs that transmit particular system information may be transmitted outside of the system bandwidth.

The FCCH (or other type of system information like L1/L2 control information, SCCH, etc.) transmitted in each frame indicates whether the data transmitted in the corresponding time duration (frame) is a MIB, an SIB, or the like. Also, the FCCH informs about which frequency and what time within the frame that each message or data is transmitted. The FCCH may be transmitted upon being divided into an FCCH for system bandwidth and an FCCH for non-system bandwidth. Accordingly, a mobile terminal that only receives the system bandwidth may receive the FCCH for system bandwidth to obtain information of each data or message that is transmitted via the system bandwidth. Also, a mobile terminal that receives the non-system bandwidth may receive the FCCH for non-system bandwidth to obtain information of each data or message that is transmitted via the non-system bandwidth.

In other words, the concepts shown in FIG. 9 are for handling the situation for mobile terminals in idle mode.

The network (system) supports the cell bandwidth of 20 MHz, while a mobile terminal typically can only support a 10 MHz bandwidth range. Thus, the L1/L2 control information needs to be transmitted in certain units (a frequency range) such as, a range of 10 MHz, 5 MHz, or the like. As a result, there may be three scenarios for the frequency ranges used by the mobile terminal for reading data. Namely, of the 20 MHz scalable cell bandwidth, the mobile terminal may read one of three frequency ranges, i.e., the lower 10 MHz, the upper 10 MHz, or a middle (intermediate) 10 MHz thereof.

For mobile terminals in RRC connected mode, because the particular cell in which the connected mode mobile terminal is located is known, any one of the three 10 MHz ranges and appropriate switching among these three 10 MHz ranges is possible. However, for a mobile terminal in idle mode, because the particular cell in which the terminal is located cannot be known, only one of these three 10 MHz ranges can be used (typically, the intermediate 10 MHz range is used). Meanwhile, the bandwidth outside the intermediate 10 MHz range can be used for transmitting and receiving resource blocks for mobile terminals in connected mode.

Here, although the above exemplary embodiment with reference to FIG. 9 is described for 10 MHz ranges, it is contemplated that the 20 MHz scalable cell bandwidth could also be divided up into 5 MHz units.

Figure 10:
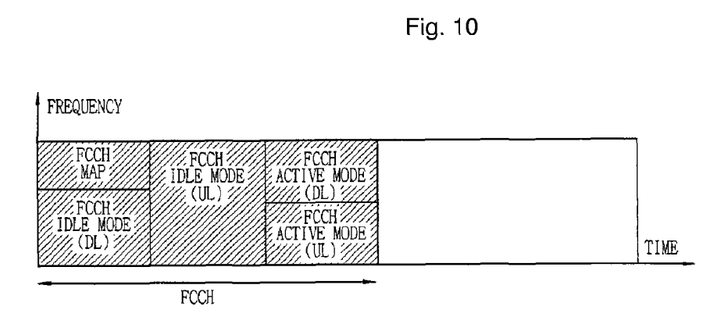
FIG. 10 is a diagram used to explain constituting information of an FCCH according to an exemplary embodiment of the present invention.

FIG. 10 is a diagram used to explain constituting information of control information (i.e., an FCCH) according to an exemplary embodiment of the present invention. The FCCH provides to the mobile terminal, various types of control information related to data and control messages transmitted during the corresponding period (i.e., during the corresponding frame). Here, the FCCH is shown to be comprised of five different FCCH portions. However, this is merely exemplary, and the number of FCCH portions may vary accordingly.

Referring to FIG. 10, the first FCCH portion is a FCCH MAP that informs about the frequency and time of the FCCH transmission, a length of the FCCH information, radio resource parameters needed for receiving the FCCH information, and the like. Such FCCH MAP may be always included in each frame. In the present invention, each frame may include all types of FCCHs or may include only portions thereof. The FCCH MAP may inform about whether or not the remaining four types of FCCH portions (excluding the FCCH MAP) are transmitted in the corresponding frame.

The second FCCH portion is a FCCH Idle Mode (DL) that includes control information needed on order to receive downlink control information when the mobile terminal is in idle mode. This second FCCH portion may be included in a corresponding frame when control information to be transmitted on the downlink exists in the frame. The control information related to common control messages such as the MIB, SIB, etc. may be included in this second FCCH portion. Also, the MIB, SIB, etc. may be included in this second FCCH portion.

The third FCCH portion is a FCCH Idle Mode (UL) that includes control information needed in order to transmit uplink control information when the mobile terminal is in idle mode. This third FCCH portion may include information that is needed for uplink random access transmissions. When the mobile terminal transmits a random access message, the network may transmit a response to the ransom access message via this third FCCH portion. Also, the third FCCH portion can be used to inform that a response to the random access message is being transmitted in the frame that is used to transmit the third FCCH portion, and to do so, the third FCCH portion includes control information related to such response to the random access message.

The fourth FCCH portion includes control information needed in order to receive downlink control information when the mobile terminal is in active mode. This fourth FCCH portion may include control information of an downlink shared channel (SCH) that is transmitted in a corresponding frame.

The fifth FCCH portion includes control information needed in order to transmit uplink control information when the mobile terminal is in active mode. This fifth FCCH portion may include control information of an uplink shared channel (SCH) that is transmitted in a corresponding frame.

The mobile terminal periodically receives the FCCH MAP and may check to see whether the corresponding frame contains any data or information that is wishes to receive. After receiving the FCCH MAP, when the mobile terminal is in idle mode, only the second and third FCCH portions are received. When the mobile terminal is in active mode, only the fourth and fifth FCCH portions are received.

In order to inform about the control information that is needed for multicast and broadcast transmissions, the network may add and transmit other FCCH portions as needed.

Figure 11:
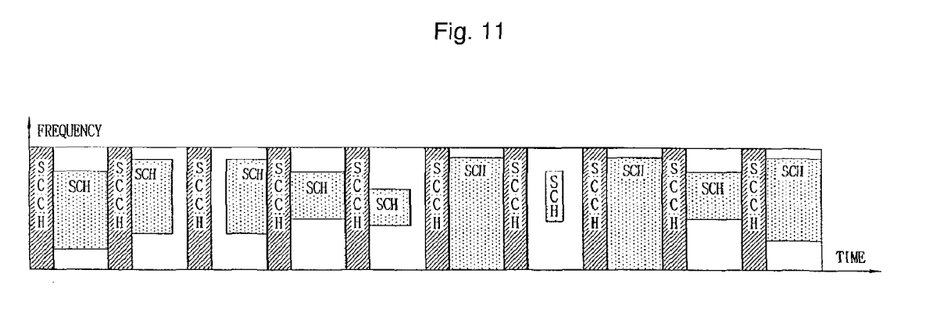
FIG. 11 shows a data reception method for a mobile terminal according to an exemplary embodiment of the present invention.

FIG. 11 shows a data reception method for a mobile terminal according to an exemplary embodiment of the present invention. Referring to FIG. 11, the SCCH channel (i.e., control information) is transmitted using a respectively different frequency and time from those of the SCH, and is transmitted once per each sub-frame. One sub-frame is 0.5 ms in duration and the SCCH channel is transmitted by using one or two symbols that constitute the corresponding sub-frame. A single sub-frame consists of 6 or 7 symbols, and respectively different symbols constitute respectively different time periods (durations).

In FIG. 11, the SCCH channel that is transmitted in a single sub-frame, transmits control information related to a SCH channel of the corresponding sub-frame. The control information transmitted through the SCCH channel may comprise a mobile terminal identifier (identity), a multicast service identifier (identity), and a logical channel identifier (identity). The logical channel identifier may inform whether the data transmitted in a sub-frame of the corresponding SCH channel is data for a mobile terminal dedicated channel (e.g., DCCH or DTCH) or data for a common channel. In particular, if the data is for a common channel, the logical channel identifier informs about the type of common channel (i.e., BCCH, PCCH, MCCH, MTCH, or CCCH).

The mobile terminal may receive the SCCH channel in a periodic manner or at every sub-frame. To do so, the base station (eNode B) transmits period information to the mobile terminal. Then, the mobile terminal may receive the sub-frames of the SCCH channel in a periodic manner according to the period information provided from the base station.

The mobile terminal obtains the logical channel identifier through the received SCCH channel, and by means of the obtained logical channel identifier, the mobile terminal can determine whether the data transmitted via the SCH channel is data for a dedicated channel or data for one of a BCCH, PCCH, MCCH, MTCH or CCCH (i.e., a common channel).

If the logical channel identifier indicates a common channel, the mobile terminal receives the sub-frame of the corresponding SCH channel to thus receive the data of the common channel.

It should be noted that FIGS. 1 through 11 show exemplary embodiments for a 10 ms frame having twenty 0.5 ms sub-frames. However, the features of the present invention are clearly applicable to other techniques that employ other frame sizes. For example, a frame size of 5 ms may be used, and to support LTE (Long Term Evolution) techniques, a frame size of 0.5 ms may be used.

Regarding the effects of the present invention, the wireless network can, in advance, inform (through a single indicator channel) about the transmission of common control information (such as particular messages, system information, or the like). A radio mobile terminal can periodically receive the single indicator channel to thus receive the common control information by using the control information of the indicator channel. By using such procedures, the operations of the mobile terminal may be simplified and mobile terminal resources can be used more efficiently.

Additionally, as the present invention provides information about where each resource block (RB) is located with respect to the frequency and time domains, system information, control information, and the like can be processed in a dynamic and flexible manner, to thus support various enhanced capabilities. Also, when frequency selective scheduling is performed, improved adaptation to channel changes can be achieved.

The present invention provides a method for processing (downlink) system information for a mobile terminal, the method comprising: receiving primary system information in a static manner; and receiving non-primary system information in a dynamic manner based on the primary system information.

The dynamic manner may be based upon at least one of frequency, time, and size of the non-primary system information. The primary system information may include scheduling information that indicates at least one of a time characteristic and a frequency characteristic of the non-primary system information. The primary system information may further comprise an indicator for indicating a particular terminal. The time characteristic and the frequency characteristic may indicate a location of each non-primary system information to be read by the particular terminal. The indicator may comprise: at least one of a terminal identifier, a service identifier, and a logical channel identifier. The non-primary system information may relate to control information. The control information may be used to read actual data. The time characteristic may relate to symbols, and the frequency information relates to sub-carriers. The non-primary information is in the form of at least one resource block. The primary system information may be in the form of a master information block (MIB), and the non-primary system information is in the form of a system information block (SIB). The MIB also contains size information of an SIB.

Also, the present invention provides a method for processing (downlink) system information for a network, the method comprising: transmitting primary system information in a static manner; and transmitting non-primary system information in a dynamic manner based on the primary system information.

The dynamic manner may be based upon at least one of frequency, time, and size of the non-primary system information. The primary system information may include scheduling information that indicates at least one of a time characteristic and a frequency characteristic of the non-primary system information. The primary system information may further comprise an indicator for indicating a particular terminal. The time characteristic and the frequency characteristic may indicate a location of each non-primary system information to be read by the particular terminal. The indicator may comprise: at least one of a terminal identifier, a service identifier, and a logical channel identifier. The non-primary system information may relate to control information. The control information may be used to read actual data. The time characteristic relates to symbols, and the frequency information may relate to sub-carriers. The non-primary information may be in the form of at least one resource block. The primary system information may be in the form of a master information block (MIB), and the non-primary system information is in the form of a system information block (SIB). The MIB may also contain size information of an SIB.

Additionally, the present invention provides a frame structure used for processing system information, the structure comprising: a first sub-frame containing static primary system information; and one or more subsequent sub-frames containing at least one dynamic non-primary system information, wherein the static primary system information includes scheduling information that indicates time and frequency information of the non-primary system information.

The static primary system information may further comprise an indicator for indicating a particular terminal. The time and frequency information may indicate a location of each dynamic non-primary system information to be read by the particular terminal. The indicator may comprise: at least one of a terminal identifier, a service identifier, and a logical channel identifier. The non-primary system information may relate to control information. The control information may be used to read actual data. The time information may relate to symbols, and the frequency information relates to sub-carriers. The dynamic non-primary information may be in the form of at least one resource block. The static primary system information may be in the form of a master information block (MIB), and the dynamic non-primary system information is in the form of a system information block (SIB). The MIB may also contain size information of an SIB. The non-primary system information may comprise control information that includes separate information for idle mode and active mode operation of a mobile terminal.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

What is claimed:

1. A method for receiving information in a mobile terminal of a mobile communication system, the method comprising:
    receiving, by the mobile terminal from a base station via a first portion of a subframe, control information via a shared downlink control channel for a specific logical channel,
    wherein the control information includes indication information indicating
        that the specific logical channel is a broadcast control logical channel (BCCH) or a paging control logical channel (PCCH), and
        that system information corresponding to the specific logical channel will be transmitted via a control message via a shared downlink data channel, the control message being a system information control message or a paging information control message respectively corresponding to the BCCH and the PCCH,
    wherein the control information further includes scheduling information for the control message, the scheduling information including information about where a radio block (RB) of the shared downlink data channel containing the system information corresponding to the specific logical channel will be located in a domain of time and frequency; and
    receiving, by the mobile terminal from the base station via a remaining portion of the subframe, the system information via the shared downlink data channel based on the received scheduling information and indication information,
    wherein the first portion of the subframe and the remaining portion of the subframe are contiguous portions of the subframe, and
    wherein the indication information comprises a logical channel identifier.

2. The method of claim 1, wherein the scheduling information further includes at least time, frequency or size information of the system information.

3. The method of claim 1, wherein the control information is received periodically.

4. A method for transmitting system information from a base station in a network in a mobile communication system, the method comprising:
- transmitting, by the base station to a mobile device via a first portion of a subframe, control information via a shared downlink control channel for a specific logical channel,
- wherein the control information includes indication information indicating
    - that the specific logical channel is a broadcast control logical channel (BCCH) or a paging control logical channel (PCCH), and
    - that system information corresponding to the specific logical channel will be transmitted via a control message via a shared downlink data channel, the control message being a system information control message or a paging information control message respectively corresponding to the BCCH and the PCCH,
- wherein the control information further includes scheduling information for the control message, the scheduling information including information about where a radio block (RB) of the shared downlink data channel containing the system information corresponding to the specific logical channel will be located in a domain of time and frequency; and
- transmitting, by the base station to the mobile terminal via a remaining portion of the subframe, the system information via the shared downlink data channel based on the received scheduling information and indication information.
- wherein the first of the subframe and the remaining portion of the subframe are contagious portions of the subframe, and
- wherein the indication information comprises a logical channel identifier.

5. The method of claim 4, wherein the scheduling information further includes at least time, frequency or size information of the system information.

6. The method of claim 4, wherein the control information is transmitted periodically.

7. A mobile terminal comprising:
a receiver configured to
- receive, from a base station via a first portion of a subframe, control information via a shared downlink control channel for a specific logical channel,
- wherein the control information includes indication information indicating
    - that the specific logical channel is a broadcast control logical channel (BCCH) or a paging control logical channel (PCCH), and
    - that system information corresponding to the specific logical channel will be transmitted via a control message via a shared downlink data channel, the control message being a system information control message or a paging information control message respectively corresponding to the BCCH and the PCCH,
- wherein the control information further includes scheduling information for the control message, the scheduling information including information about where a radio block (RB) of the shared downlink data channel containing the system information corresponding to the specific logical channel will be located in a domain of time and frequency; and
- receive, by from the base station via a remaining portion of the subframe, the system information via the shared downlink data channel based on the received scheduling information and indication information,
- wherein the first portion of the subframe and the remaining portion of the subframe are contiguous portions of the subframe, and
- wherein the indication information comprises a logical channel identifier.

8. A base station comprising:
a transmitter configured to
- transmit, to a mobile device via a first portion of a subframe, control information via a shared downlink control channel for a specific logical channel,
- wherein the control information includes indication information indicating
    - that the specific logical channel is a broadcast control logical channel (BCCH) or a paging control logical channel (PCCH), and
    - that system information corresponding to the specific logical channel will be transmitted via a control message via a shared downlink data channel, the control message being a system information control message or a paging information control message respectively corresponding to the BCCH and the PCCH,
- wherein the control information further includes scheduling information for the control message, the scheduling information including information about where a radio block (RB) of the shared downlink data channel containing the system information corresponding to the specific logical channel will be located in a domain of time and frequency; and
- transmit, to the mobile terminal via a remaining portion of the subframe, the system information via the shared downlink data channel based on the received scheduling information and indication information,
- wherein the first portion of the subframe and the remaining portion of the subframe are contiguous portions of the subframe, and
- wherein the indication information comprises a logical channel identifier.

* * * * *